(12) United States Patent
Botea et al.

(10) Patent No.: US 11,561,964 B2
(45) Date of Patent: Jan. 24, 2023

(54) INTELLIGENT READING SUPPORT

(71) Applicant: INTERNATIONAL BUSINESS MACHINES CORPORATION, Armonk, NY (US)

(72) Inventors: Adi Botea, Dublin (IE); Beat Buesser, Ashtown (IE); Bei Chen, Blanchardstown (IE); Akihiro Kishimoto, Castleknock (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 642 days.

(21) Appl. No.: 16/601,438

(22) Filed: Oct. 14, 2019

(65) Prior Publication Data

US 2021/0109918 A1  Apr. 15, 2021

(51) Int. Cl.

| | |
|---|---|
| *G10L 15/22* | (2006.01) |
| *G06F 16/23* | (2019.01) |
| *G06F 16/248* | (2019.01) |
| *G06N 5/02* | (2006.01) |
| *G10L 15/18* | (2013.01) |
| *G06N 20/00* | (2019.01) |
| *G10L 15/08* | (2006.01) |

(52) U.S. Cl.
CPC ........ *G06F 16/2379* (2019.01); *G06F 16/248* (2019.01); *G06N 5/022* (2013.01); *G06N 20/00* (2019.01); *G10L 15/1815* (2013.01); *G10L 15/22* (2013.01); *G10L 2015/088* (2013.01)

(58) Field of Classification Search
CPC .... G06F 16/2379; G06F 16/23; G06F 16/248; G06F 40/30; G06F 40/20; G06N 5/022; G06N 5/02; G06N 20/00; G06N 5/04; G10L 15/1815; G10L 15/18; G10L 15/22; G10L 2015/088; G10L 15/08; G10L 15/26
See application file for complete search history.

(56) References Cited

U.S. PATENT DOCUMENTS

| | | | |
|---|---|---|---|
| 5,937,084 | A | 8/1999 | Crabtree et al. |
| 7,812,860 | B2 | 10/2010 | King et al. |
| 2011/0188783 | A1 | 8/2011 | Minoni et al. |
| 2016/0328607 | A1 | 11/2016 | Krishnan |

(Continued)

FOREIGN PATENT DOCUMENTS

| | | |
|---|---|---|
| DE | 102005001064 A1 | 7/2006 |
| EP | 0910035 A1 | 4/1999 |
| WO | 2010077701 A1 | 7/2010 |

OTHER PUBLICATIONS

Choudhary et al. "A New Approach to Detect and Extract Characters from Off-Line Printed Images and Text" Procedia Computer Science 17 ( 2013 ) 434-440 (2013).

(Continued)

*Primary Examiner* — Huyen X Vo
(74) *Attorney, Agent, or Firm* — Griffiths & Seaton PLLC

(57) ABSTRACT

Embodiments for providing data content consumption support by a processor. Data from one or more data sources may be captured and received by one or more data capturing devices while a user is consuming the data on the one or more data sources. A domain knowledge may be automatically updated with the data. A response may be provided to one or more queries based upon information accessed from the knowledge domain.

20 Claims, 8 Drawing Sheets

(56) References Cited

U.S. PATENT DOCUMENTS

| | | | |
|---|---|---|---|
| 2017/0140052 A1* | 5/2017 | Bute, III | G06F 16/9024 |
| 2017/0308681 A1* | 10/2017 | Gould | G06Q 30/0248 |
| 2018/0120594 A1 | 5/2018 | Li | |
| 2018/0225380 A1* | 8/2018 | Netto | G06F 16/9535 |
| 2018/0349497 A1 | 12/2018 | Skobov | |
| 2019/0147246 A1 | 5/2019 | Bossut et al. | |

OTHER PUBLICATIONS

Lebourgeois et al. "A fast and efficient method for extracting text paragraphs and graphics from unconstrained documents" IEEE 1992 (6 Pages).

Rzayev et al. "Reading on Smart Glasses: The Effect of Text Position, Presentation Type and Walking" CHI 2018, Apr. 21-26, 2018 (9 Pages).

* cited by examiner

INTELLIGENT READING SUPPORT

BACKGROUND OF THE INVENTION

Field of the Invention

The present invention relates in general to computing systems, and more particularly to, various embodiments for providing intelligent reading support using a computing processor.

Description of the Related Art

Due to the recent advancement of information technology and the growing popularity of the Internet, a vast amount of information is now available in digital form. Such availability of information has provided many opportunities. Digital and online information is an advantageous source of business intelligence that is crucial to an entities survival and adaptability in a highly competitive environment.

SUMMARY OF THE INVENTION

Various embodiments for providing data content consumption support by a processor, are provided. In one embodiment, by way of example only, a method for providing intelligent reading support, again by a processor, is provided. Data from one or more data sources may be captured and received by one or more data capturing devices while a user is consuming the data on the one or more data sources. A domain knowledge may be automatically updated with the data. A response may be provided to one or more queries based upon information accessed from the knowledge domain.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
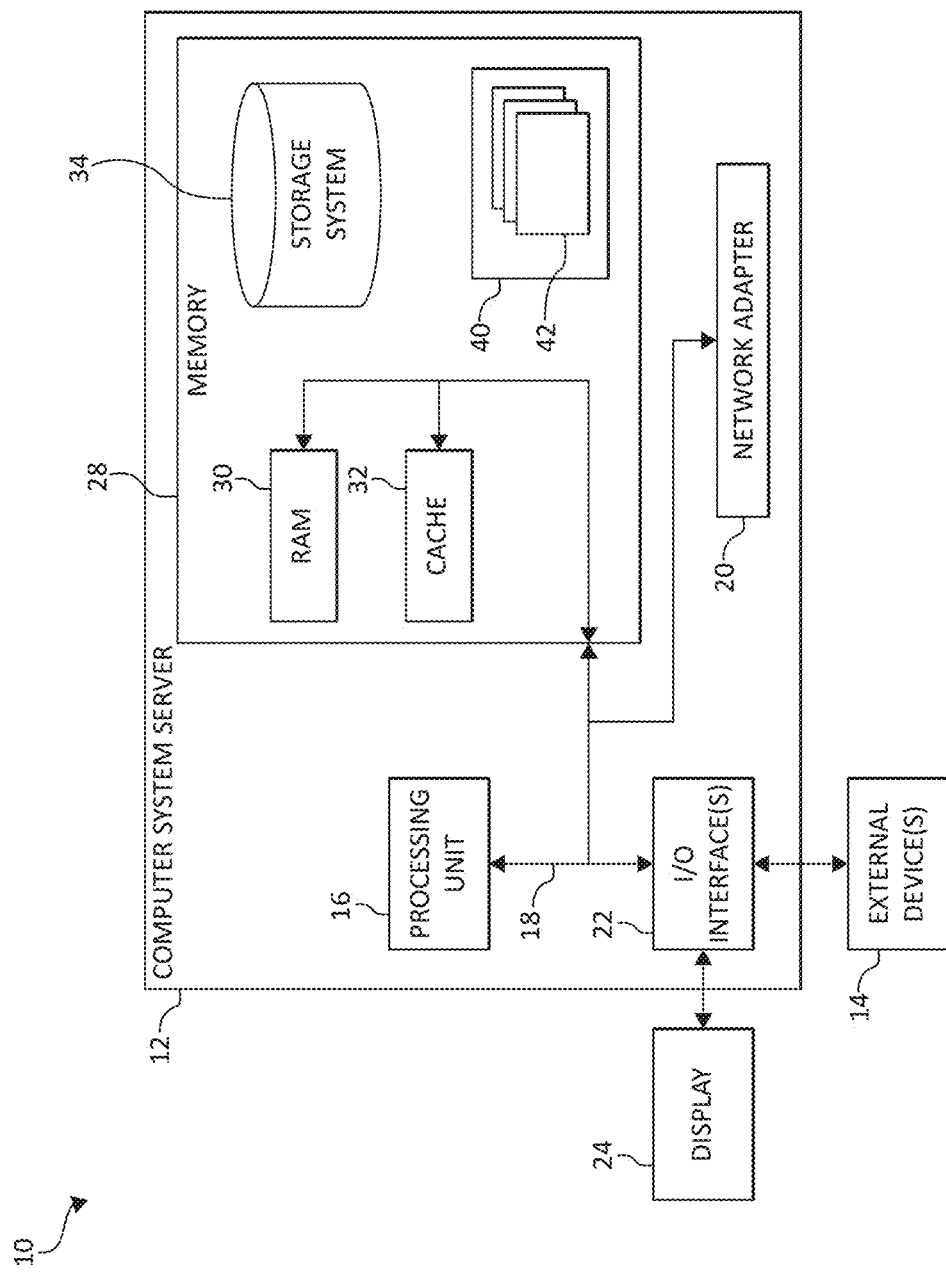
FIG. 1 is a block diagram depicting an exemplary cloud computing node according to an embodiment of the present invention.

As the amount of electronic information continues to increase, the demand for sophisticated information access systems also grows. Digital or "online" data has become increasingly accessible through real-time, global computer networks. The data may reflect many aspects of the behavior of groups or individuals in a population, including scientific, political, governmental, educational, financial, travel, traffic flow, shopping and leisure activities, healthcare, and so forth.

Additionally, many users may engage in reading activities using printed text, digital data (e.g., electronic version of printed text), or both. The decision to use printed text or digital text may vary based on availability or even personal preference. However, useful support features such as, for example, searching functions, currently available on electronic devices, are not directly available for printed texts (e.g., electronic devices may search for selected words or pages). Additionally, users may use devices, such as computers, tablets and smartphones that include viewing screens to read electronic books. Furthermore, users may typically locate topics, sections, and/or entities by searching for the electronic books using keywords, names of authors, and categories/topics. Thus, when a user elects to use the printed text for reading, many general or personalized reading support features are unavailable. Accordingly, a need exits for providing reading support using printed text, digital data, or both, with no dependence on existing digital information.

As such, various embodiments described herein provide intelligent reading support. Data from one or more data sources may be captured and received by one or more data capturing devices while a user is consuming the data on the one or more data sources. A domain knowledge may be automatically updated with the data. A response may be provided to one or more queries based upon information accessed from the knowledge domain.

In one aspect, the present invention may provide one or more reading support features for both printed text, digital data (e.g., electronic version of printed text), or both. For example, the present invention may provide searching functions, ability to understand and maintain information that has been currently consumed (e.g., those portions of a book currently read), learn, understand, and provide answers to one or more queries related to the consumed content, and/or real-time learning and recognition of content consumed via printed text, digital data, or both.

Thus, the present invention may analyze visual input from one or more pages of printed text, electronic text, or both that have been read (e.g., consumed). The present invention may convert the images to text, and analyze the text by extracting useful information such as context, relations, definitions, etc.

In one aspect, the present invention may provide information depending on the context such as, for example, the current page of the book (e.g., "on what page is "entanglement" introduced?" and/or "What is the name of John Doe's dog?"). In an additional aspect, the present invention may maintain and track learned/extracted information from the consumed data content. The present invention may also prematurely avoid revealing important information (e.g., avoid disclosing in a given setting such as, for example, the final outcome of a story line/plot prior) and answer only questions about the current amount of consumed content such as, for example, the pages read up to the current point in time. The present invention may learn relations/relationships among information from multiple stories, books, documents, articles, blogs, and/or other printed text and/or electronic books (e.g., such as a series of books from a common author). The present invention may provide customized and/or personalized reading support for stories, books, documents, articles, blogs, and/or other printed text and/or electronic books with no dependence on existing digital information. The present invention may provide the ability to answer questions about the text read so far and/or provides (real-time) estimations of current knowledge and is able to decide which information is appropriate to reveal.

In one aspect, the present invention provides for discovery and analysis of interpersonal relationships, contextual data, definitions, semantic references, an automatically extracted from the consumed data content. The present invention takes as input content consumed in real-time and to automatically identify named entities corresponding to persons, one or more concepts, semantic references or definitions, keywords, and/or one or more relationships between one or more entities from the data and enhances existing data in a domain knowledge with the data. The present invention may provide as output a multigraph of the extracted information.

In one aspect, a thesaurus or ontology as source for the domain knowledge may be used. In one aspect, the term "domain" is a term intended to have its ordinary meaning. In addition, the term "domain" can include an area of expertise for a system or a collection of material, information, content and/or other resources related to a particular entity or subject or subjects relating to the entities. For example, a domain can refer to governmental, financial, healthcare, advertising, commerce, scientific, industrial, educational, medical and/or biomedical-specific information. A domain can refer to information related to any particular entity and associated data that may define, describe, and/or provide a variety of other data associated with one or more entities. The domain can also refer to subject matter or a combination of selected subjects.

The term ontology is also a term intended to have its ordinary meaning. In one aspect, the term ontology in its broadest sense may include anything that can be modeled as ontology, including but not limited to, taxonomies, thesauri, vocabularies, and the like. For example, an ontology may include information or content relevant to a domain of interest or content of a particular class or concept. Content can be any searchable information, for example, information distributed over a computer-accessible network, such as the Internet. A concept can generally be classified into any of a number of concepts which may also include one or more sub-concepts. Examples of concepts may include, but are not limited to, scientific information, healthcare information, medical information, biomedical information, business information, educational information, commerce information, financial information, pricing information, information about individual people, cultures, groups, sociological groups, market interest groups, institutions, universities, governments, teams, or any other information group. The ontology can be continuously updated with the information synchronized with the sources, adding information from the sources to the ontology as models, attributes of models, or associations between models within the ontology.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
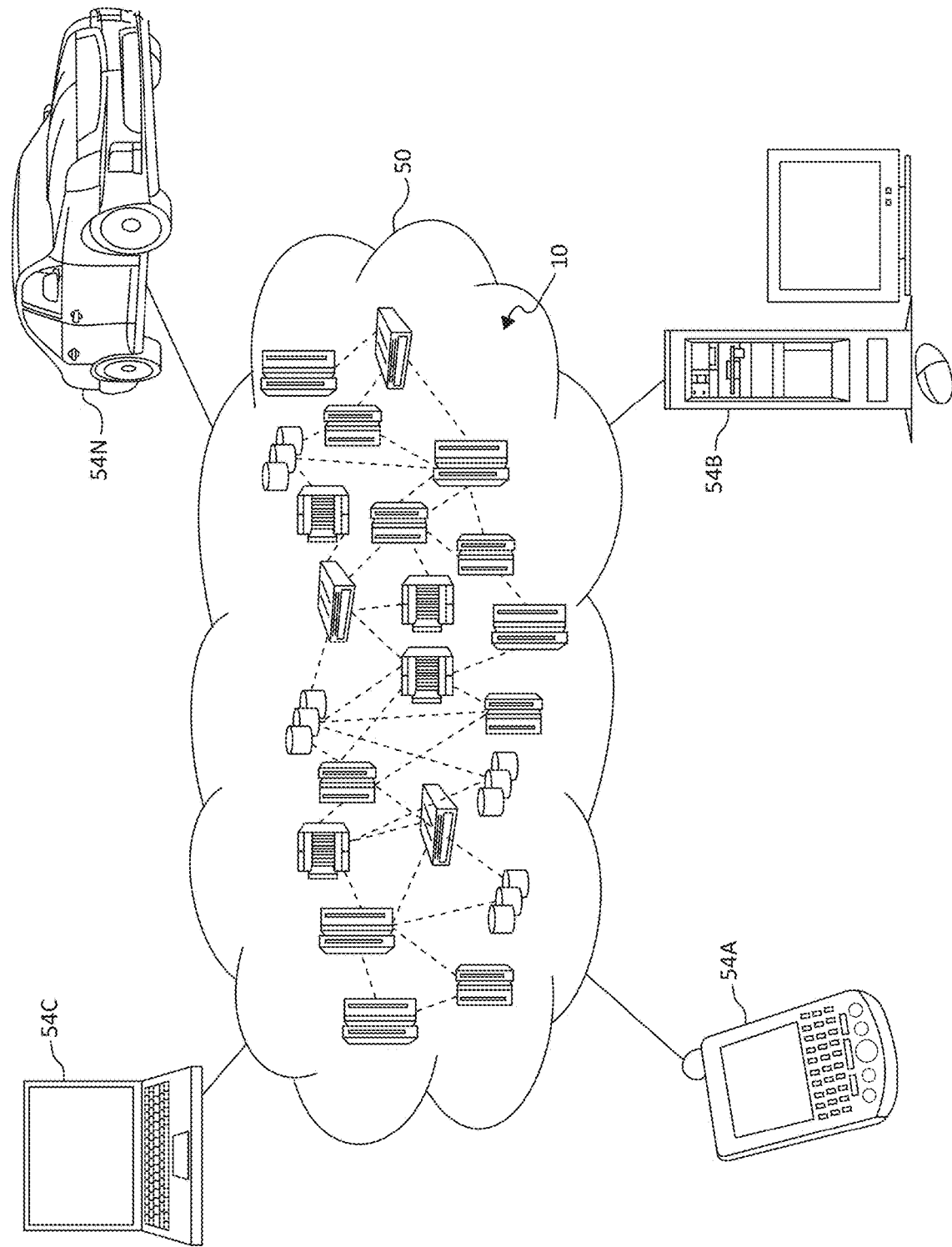
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
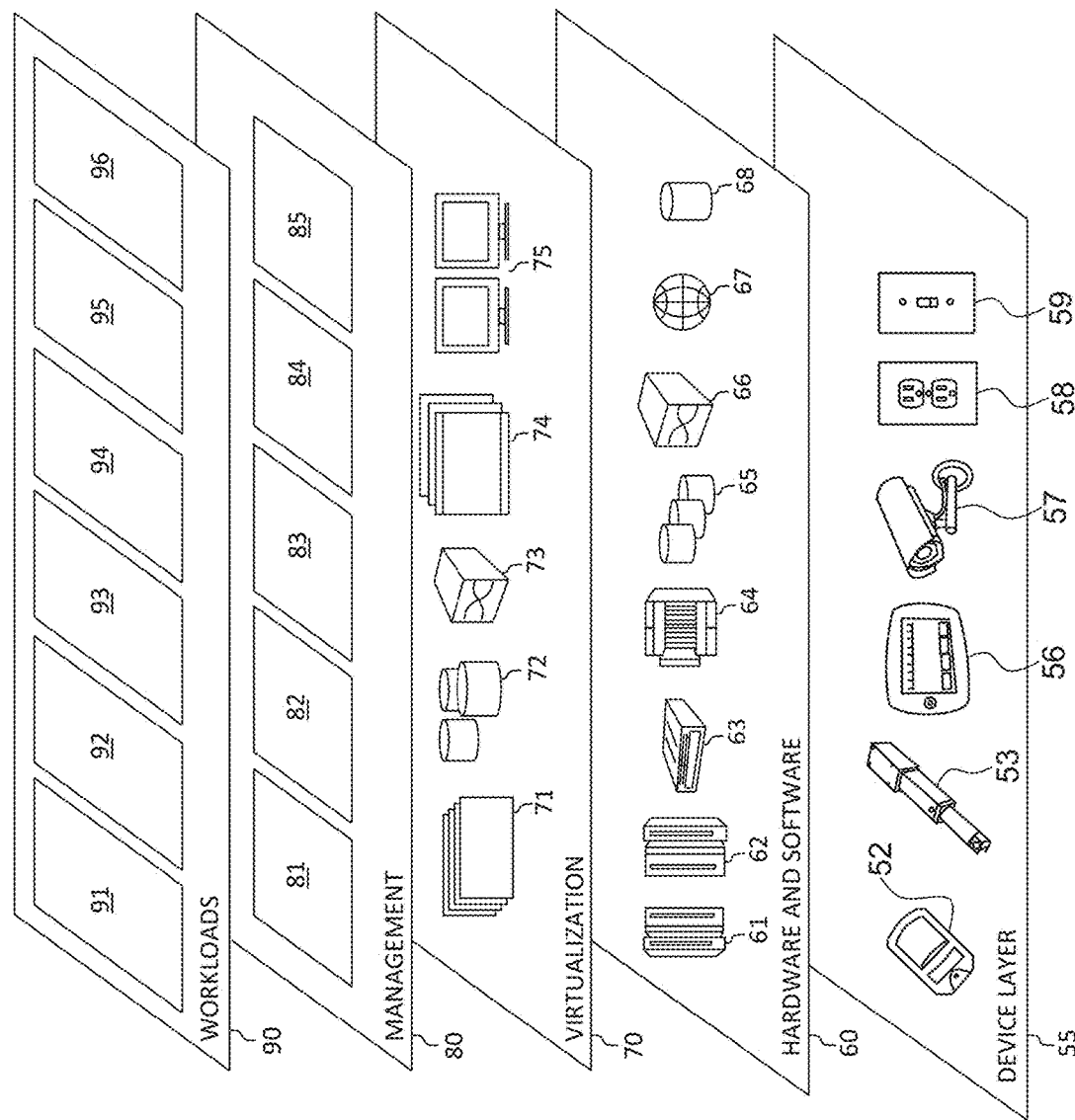
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for providing intelligent reading support. In addition, workloads and functions 96 for providing intelligent reading support may include such operations as data analysis (including data collection and extraction in real-time of consumed data content), and predictive data analytics functions. One of ordinary skill in the art will appreciate that the workloads and functions 96 for providing intelligent reading support may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the present invention provides novel solutions for providing intelligent reading support. In one aspect, a computing device (e.g., computer, camera, smart phone, smart glasses, IoT device/sensor, etc.) may capture the contents of data (e.g., text data) and also capture input from a user in the form of queries to provide a response to the query (e.g., provide audible, video, and/or written information back to the user).

In one aspect, visual input of the text that the user is reading may be received from a computing device. A knowledge base may be maintained and updated with new information automatically extracted from the text that the user is reading. One or more queries may be received from the user and the knowledge base may be searched to provide answers to the user's query. It should be noted that the knowledge base may be broader than the contents of the data currently consumed (e.g., the text read so far). Thus, the present invention may start from an existing knowledge base, and enhance it with knowledge from the current text discovered automatically. For instance, a single knowledge base may be maintained for all books or a series of books written by an author. The knowledge base may be reset to empty at the beginning of reading a new text. It should be noted that "resetting" the knowledge base to empty means all newly acquired knowledge (e.g., the current consumed content) is erase while keeping/maintaining a base knowledge.

In one aspect, user input (e.g., one or more queries) may be capture via a microphone, a smart pen, with one or more hand gestures (e.g., a hand gesture pointing to the text and captured by a camera). One or more responses (e.g., answers to the queries) may be provided to the user through one or more computing devices and/or IoT devices/sensors such as, for example, speakers, headphones, computers, tablets, a graphical user interface ("GUI"), a display (e.g., smart glasses or a screen). Also, one or more suggestions may be provided for a next revision/edition of the text (e.g., a suggestion to an author to make one or more editorial changes). Also, a context may be considered, analyzed, and taken into account to decide whether some information should or should not be revealed (e.g., don't give away the name of a criminal in a detective book.)

Figure 4:
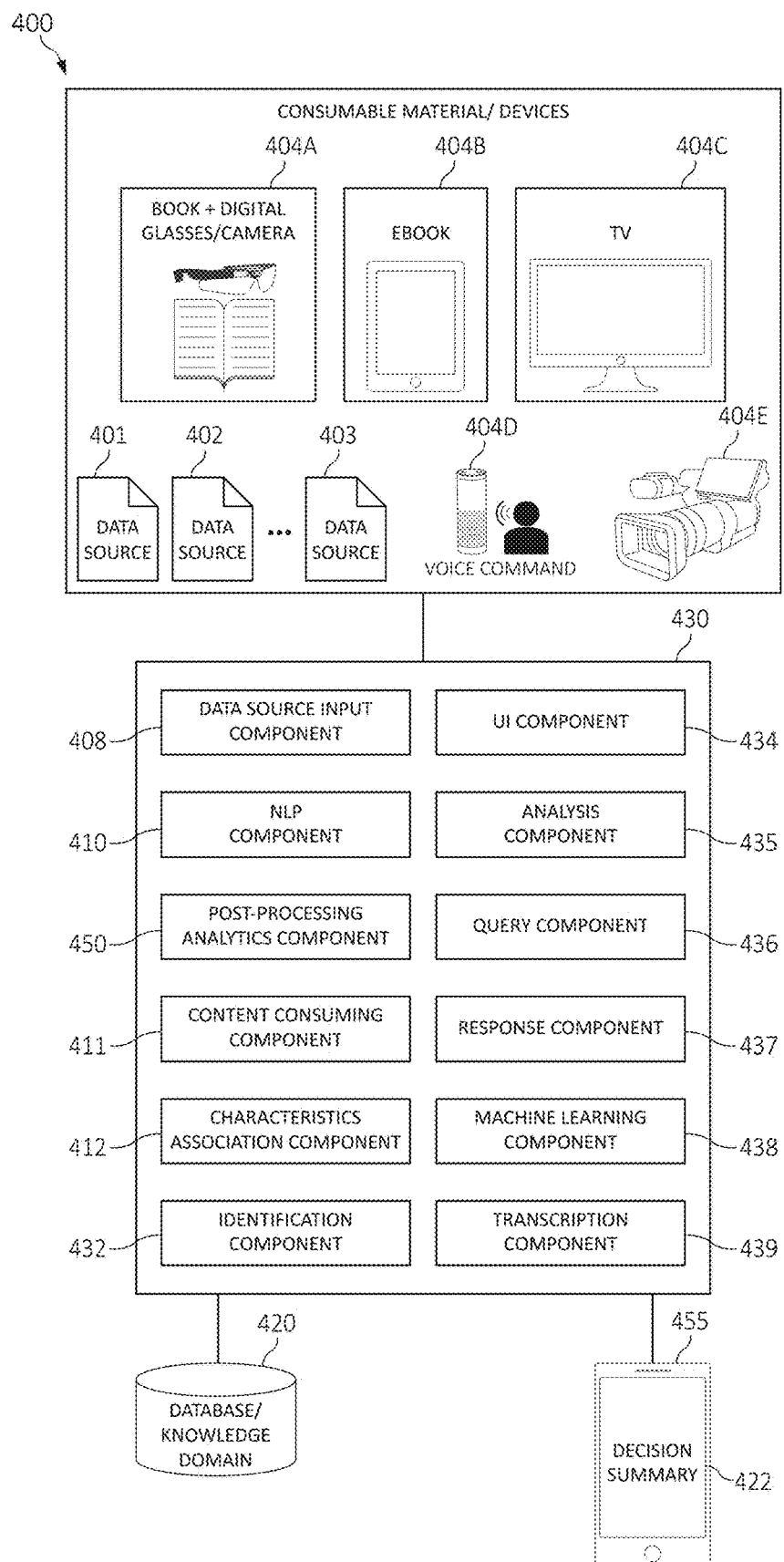
FIG. 4 is a block diagram for providing data content consumption support according to an embodiment of the present invention.

FIG. 4 is diagram of a computing system 400 for providing intelligent reading support in accordance with aspects of the present invention. As will be seen, many of the functional blocks may also be considered "modules" of functionality, in the same descriptive sense as has been previously described in FIGS. 1-3.

As will be seen, many of the functional blocks may also be considered "modules" of functionality, in the same descriptive sense as has been previously described in FIGS. 1-3. With the foregoing in mind, the module blocks of computing system 400 may also be incorporated into various hardware and software components of a system for providing intelligent reading support methods and features in accordance with the present invention, such as those described in FIGS. 1-3. Many of the functional blocks of computing system 400 may execute as background processes on various components, either in distributed computing components, or on the user device, or elsewhere.

Multiple data sources 401, 402, 403, and/or -404A-E ("401-404A-E") may be provided by one or more content contributors. The data sources and/or content consumable devices 401-404A-E may be provided as a corpus or group of data sources defined and/or identified. The data sources and/or content consumable devices 401-404A-E may include, but are not limited to, data sources relating to one or more documents, materials related to emails, books, scientific papers, online journals, journals, articles, drafts, audio data, video data, and/or other various documents or data sources capable of being published, displayed, interpreted, transcribed, or reduced to text data. The data sources and/or content consumable devices 401-404A-E may be all of the same type, for example, pages or articles in a wiki or pages of a blog. Alternatively, the data sources and/or content consumable devices 401-404A-E may be of different types, such as word documents, wikis, web pages, power points, printable document format, or any document capable of being analyzed by a natural language processing system.

The data sources and/or content consumable devices 401-404A-E may also include content consumable devices capable of consuming one or more data sources such as, for example, data sources 401, 402 and/or 403. For example, content consumable devices may include digital camera/glasses, an ebook (e.g., ebook displayed on a computing device) capable of having content scanned, read, and/or recorded while consuming the data source depicted on the ebook, computer, television, laptop, video/digital camera, a microphone, speaker, and/or other computing device equipped and/or configured for producing audio sounds, media images/video and/or consuming, reading, and/or listening to audio sounds, media images/video.

For example, in addition to text based documents, other data sources such as audio, video or image sources may also be used wherein the audio, video or image sources may be pre-analyzed to extract or transcribe their content for natural language processing, such as converting from audio to text and/or image analysis. For example, a voice command issued by a content contributor may be detected by a voice-activated detection device 404D and record each voice command or communication. The recorded voice command/communication may then be transcribed into text data for natural language processing. As an additional example, a video capturing device 404A and/or 404E (e.g., a camera and/or digital glasses) may record a video such as, for example, a webinar or meeting where cameras are installed in a room for broadcasting the meeting to remote locations where various intellectual property content contributors may collaborate remotely. The video data captured by the video capturing device 404A and/or 404E may be analyzed and transcribed into images or text data for natural language processing.

The group of data sources and/or content consumable devices 401-404A-E (e.g., "consumable material/devices) are captured, consumed, and/or extracted in real-time while a user is consuming the data content of one or more of the data sources and/or content consumable devices 401-404A-E such as, for example, content consuming support system 430 using natural language processing (NLP) and artificial intelligence (AI) to provide processed content.

The data sources and/or content consumable devices 401-404A-E may be analyzed by an NLP component 410 (and a transcription component 439 if necessary) to data mine or transcribe in real-time while the content is being consumed by a reader that is relevant information from the content of the data sources and/or content consumable devices 401-404A-E (e.g., documents, emails, reports, notes, audio records, video recordings, live-streaming communications, etc.) in order to display the information in a more usable manner and/or provide the information in a more searchable manner. The NLP component 410 may be provided as a cloud service or as a local service.

The content consuming support system 430 may include the NLP component 410, a content consuming component 411, a characteristic association component 412, and a post-processing component. The NLP component 410 may be associated with the consuming component 411. The content consuming component 411 may be used for inputting the data sources and/or content consumable devices 401-404A-E and running NLP and AI tools against them, learning the content, such as by using the machine learning component 438. It should be noted that other components of FIG. 4 may also employ one or more NLP systems and the NLP component 410 is merely illustrated by way of example only of use of an NLP system. As the NLP component 410 (including the machine learning component 438) learns different sets of data, the characteristics association component 412 (or "cognitive characteristics association component") may use the artificial intelligence to make cognitive associations or links between data sources and/or content consumable devices 401-404A-E by determining common concepts, methods, features, semantic references, keywords, similar characteristics, and/or an underlying common topic.

"Intelligence" is the mental process of knowing, including aspects such as awareness, perception, reasoning and judgment. An AI system uses artificial reasoning to interpret the data sources and/or content consumable devices 401-404A-E and extract their topics, ideas, or concepts. The learned decisions, decision elements, alternatives to the decision, alternative options/choices, decision criteria, concepts, suggestions, topics and subtopics of a domain of interest, may not be specifically named or mentioned in the data sources and/or content consumable devices 401-404A-E and is derived or inferred by the AI interpretation.

The learned content of the data sources and/or content consumable devices 401-404A-E consumed by the NLP system may be merged into a database 420 (and/or knowledge domain) or other data storage method of the consumed content with learned concepts, methods, and/or features of the data sources and/or content consumable devices 401-404A-E providing association between the content referenced to the original data sources and/or content consumable devices 401-404A-E.

The database 420 may also work in conjunction with the transcription component 439 to maintain a timestamped record of all interactions and contributions of each content contributor, decision, alternative, criteria, subject, keyword, definitions, semantic references, topic, or idea. The database 420 may record and maintain the evolution of decisions, alternatives, criteria, subjects, keyword, definitions, semantic references, topics, ideas, or content discussed in the data sources and/or content consumable devices 401-404A-E.

The database 420 may track, identify, and associate all queries, query-responses/answers, communication threads, messages, transcripts, and the like of all data generated during all stages of the development or "life cycle" of the decisions, decision elements, alternatives, choices, criteria, subjects, keyword, definitions, semantic references, topics, or ideas. The merging of the data into one database 420 (which may include a domain knowledge) allows the content consuming support system 430 to act like a search engine, but instead of keyword searches, it will use an AI method of making cognitive associations between the data sources using the deduced concepts. In one aspect, the domain knowledge may be an ontology of concepts representing a domain of knowledge, which may include both previously consumed content (e.g., previously read books from a book series such as, for example, book 1 of a 10 book series) and currently consumed content (e.g., a currently read book).

The content consuming support system 430 may include a user interface ("UP") component 434 (e.g., an interactive graphical user interface "GUI") providing user interaction with the indexed content for mining and navigation and/or receiving one or more inputs/queries from a user relating to consumed content. More specifically, the user interface component 434 may be in communication with a wireless communication device 455 (see also the PDA or cellular telephone 54A, the desktop computer 54B, the laptop computer 54C, and/or the automobile computer system 54N of FIG. 2) for also providing user input for inputting data such as, for example, data sources and/or content consumable devices 401-404A-E and also providing user interaction with the consumed content (e.g., pages of book the user is reading). The wireless communication device 455 may use the UI component 434 (e.g., GUI) for providing input of data and/or providing a query functionality such as, for example, interactive GUI functionality for enabling a user to enter a query in the GUI 422 relating to the consumed data content. For example, GUI 422 may display one or more responses to one or more queries and provided by the content consuming support system 430.

The content consuming support system 430 may also include an identification component 432. The content consuming support system 430 may include a post-processing analytics component 450 that may be used to identify consumed data content by one or more users involved in the communications. The post-processing analytics component 450 may also be used to provide one or more recommendations or suggestions (via the UI component) to follow relating to the one or more decisions. The post-processing analytics component 450 may also provide one or more alternative suggestions relating to the one or more decisions, consensus, and/or dissension.

A transcription component 439 may also be included in the content consuming support system 430. For example, the transcription component 439 may be used to transcribe audio data or image/video data from data sources 404 or 405. For example, a voice command/communication captured by the voice-activated detection device 404 may be transcribed by the transcription component 439 into text data for natural language processing. As an additional example, the video data captured by the video capturing device 405 may be analyzed and transcribed by the transcription component 439 into text data for natural language processing.

The identification component 432 may use data retrieved directly from one or more data sources or stored in the database 420. The identification component 432 may identify selected data content of the consumed content or alternative and historical consumed content that pertain to one or more queries of the user.

The content consuming support system 430 may also include an analysis component 435, a query component 436, a response component 437, the machine learning component 438, and/or the transcription component 439.

The analysis component 435 may analyze the received data from the one or more data sources and/or content consumable devices 401-404A-E captured by one or more data capturing devices while a user is consuming the data on the one or more data sources and/or content consumable devices 401-404A-E. The domain knowledge of the database 420 may be automatically updated with the consumed data content. That is, the analysis component 435 may analyze the data to identify a current amount of consumed data, the one or more queries (received via the query component 436) relating to selected portions of the consumed data or historically consumed content, or a combination thereof.

A response may be provided, via the response component 437, to one or more queries based upon information accessed from the knowledge domain. That is, the response component 437 provides the response via the audio capturing or display device of one or more data sources and/or content consumable devices 401-404A-E, the image capturing or display device, the IoT device or sensor, the GUI, the electronic stylus, or a combination thereof.

The content consuming support system 430, in association with the response component 437, may capture the one or more queries via the one or more data sources and/or content consumable devices 401-404A-E (e.g., an audio capturing or display device, an image capturing or display device, an IoT device or sensor, a GUI, an electronic stylus, or a combination thereof.

The content consuming component 411 may extract the data from one or more data sources while the user is consuming the data. The extracted data includes image data, audio data, media data, contextual data, relational data pertaining to current amount of consumed content or historically consumed content, or a combination thereof.

The content consuming component 411, in association with the analysis component 435, may enhance existing data in the database 420 with the data. The response component 437 may suggest one or more revisions or editions to the data captured from the one or more data sources and/or content consumable devices 401-404A-E. The content consuming component 411, in association with the analysis component 435, may reset the database 420 (e.g., domain knowledge) upon commencement of consuming alternative data from one or more alternative data sources.

The identification component 432, in association with the machine learning component 438, may search and identify, in a knowledge graph, one or more concepts, semantic references or definitions, keywords, or one or more relationships between one or more entities from the data according to the one or more queries, wherein the one or more concepts, the semantic references or definitions, the keywords, and the one or more entities are nodes within the knowledge graph representing the domain knowledge.

The machine learning component 438, in association with the content consuming component 411, may implement a machine learning operation to perform a natural language processing ("NLP") operation upon the data, convert image data, audio data, or a combination thereof to textual data, determine one or more concepts, semantic references or definitions, keywords, or one or more relationships between one or more entities, determine a selected amount of consumed data or non-consumed data to be included in the response to the one or more queries, restrict an alternative selected amount of the consumed data or the non-consumed data from being included in the response to the one or more queries, and/or learn one or more concepts, semantic references or definitions, keywords, or one or more relationships between one or more entities from the data.

In one aspect, once the NLP component 410 has carried out the linking of the data, /.; the identification component 432 may mine the associated concepts, topics, or similar characteristics from the database 420 of the consumed content to assign a degree of ownership to each content contributor or participants in the discussion. This can be helpful to identify persons who provide useful decision elements such as, for example, alternatives or relevant criteria, it can also be used for instance for various types of data.

The content consuming support system 430 may also include a machine learning component 438. The machine learning component 438 may apply one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural networks, Bayesian statistics, naive Bayes classifier, Bayesian network, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Figure 5A:
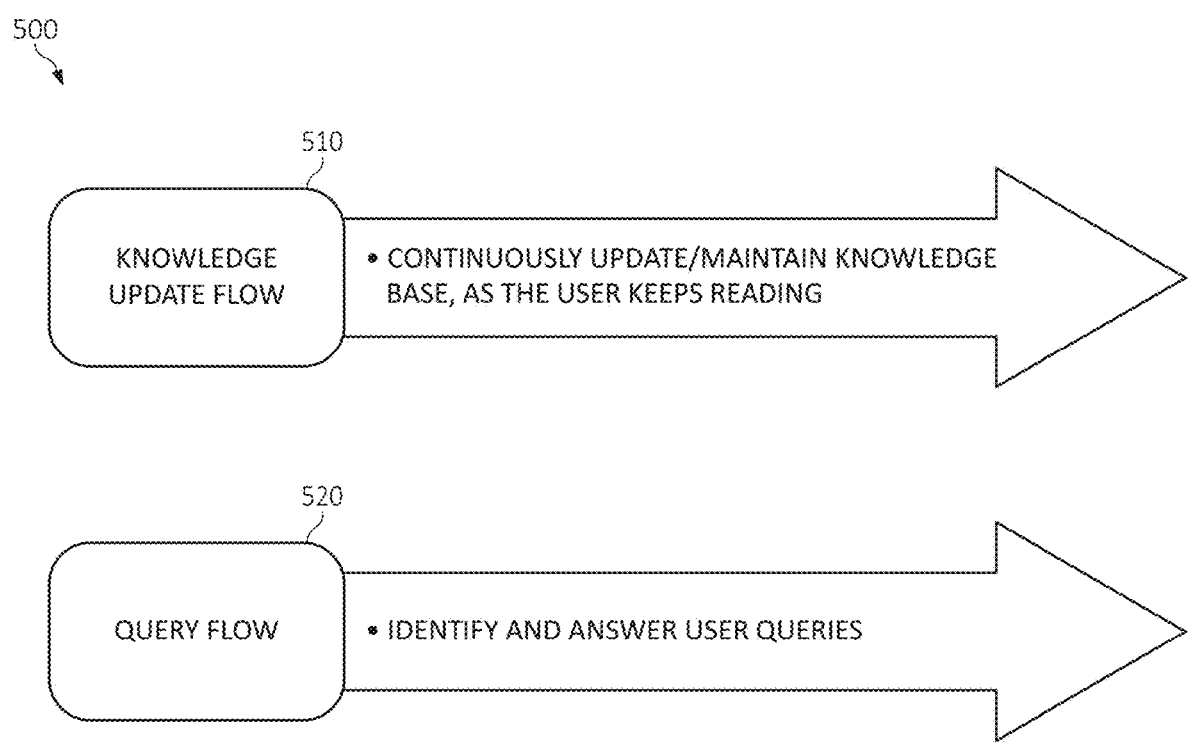
FIGS. 5A-5C are additional diagrams depicting exemplary operations for providing a knowledge domain update flow and query flow for providing data content consumption support in accordance with aspects of the present invention.
Figure 5B:
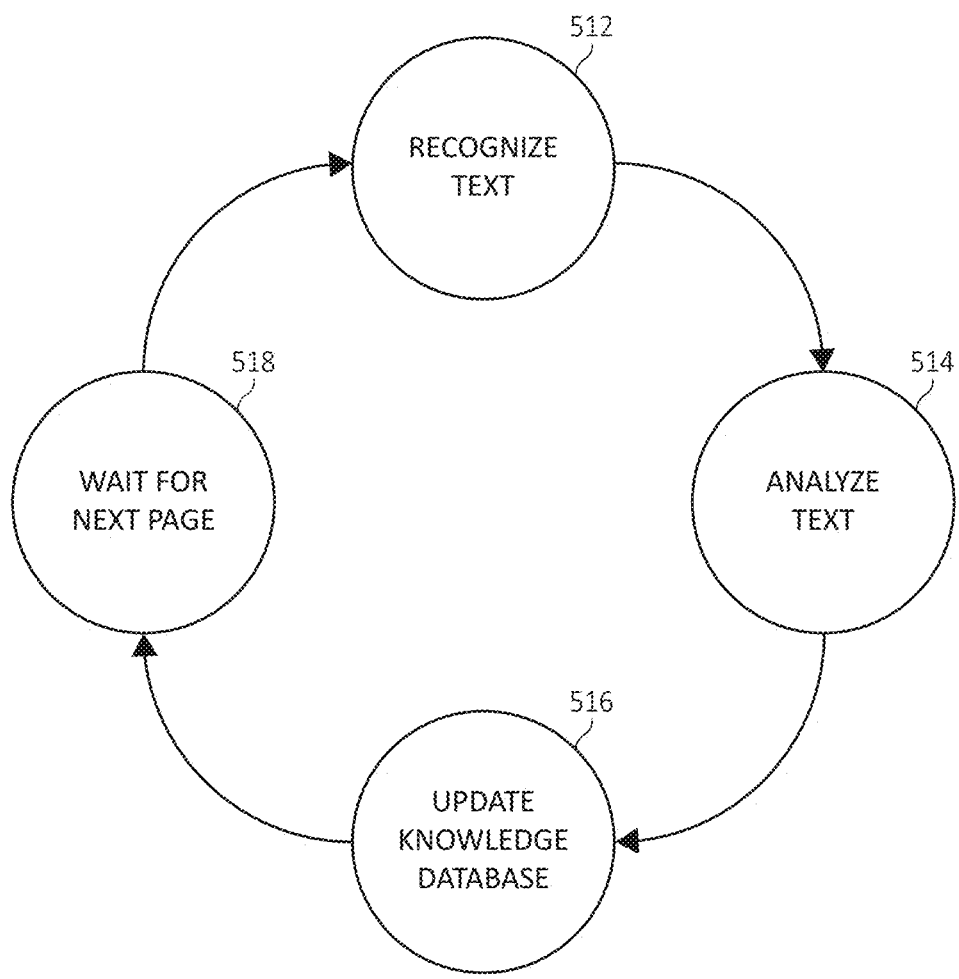

In view of the method 400 of FIG. 4, FIGS. 5A-5B depict exemplary operations 500 (including a knowledge update flow operation 510 and a query flow operation 520) for providing a knowledge domain update flow and query flow for providing data content consumption support. The computing system 400 for providing intelligent reading support may be implemented and used for executing operations 500, 510, and 520 in hardware and/or software, such as by the computer/server 12 (FIG. 1), the workloads layer 90 (FIG. 3), and/or the various aspects, functionality, systems, and components described in FIG. 4.

Turning now to FIG. 5A a diagram of exemplary functionality 500 relating to an knowledge update flow operation 510 and a query flow operation 520. As shown, the various blocks of functionality are depicted with arrows designating the blocks' 500 relationships with each other and to show process flow. Additionally, descriptive information is also seen relating each of the functional blocks 500. As will be seen, many of the functional blocks may also be considered "modules" of functionality, in the same descriptive sense as has been previously described in FIGS. 1-3. With the foregoing in mind, the module blocks 500 may also be incorporated into various hardware and software components of a system for extraction and summarization of decisions in accordance with the present invention, such as those described in FIGS. 1-3. Many of the functional blocks 500 may execute as background processes on various components, either in distributed computing components, or on the user device, or elsewhere.

As depicted, two parallel operation flows may be executed, which may include knowledge update flow operation 510 and a query flow operation 520 for providing data content consumption support, which may be executed via the computing system 400 of FIG. 4.

In one aspect, the knowledge update flow operation 510, which is further illustrated in FIG. 5B, includes continuously updating and maintaining a knowledge base (e.g., a database and/or knowledge domain) as a user continues to consume data content (e.g., continues to read a book). In parallel with the knowledge update flow operation 510, the query flow operation 520, which is further illustrated in FIG. 5C, may identify one or more queries and provide an answer to the one or more queries.

As depicted in FIG. 5B, the knowledge update flow operation 510 may include an operation where consumed data (e.g., text data) is recognized, as in block 512. In block 514, the consumed data (e.g., text data) is analyzed. In block 516, the knowledge base (e.g., a database and/or knowledge domain) may be updated and/or extended with the consumed data. It should be noted that in the knowledge update flow operation 510, one or more nodes/edges may be matched in a knowledge domain graph (e.g., a resource description framework "RDF" graph). The knowledge update flow operation 510 may store/maintain one or more synonyms for entities and for relations in the knowledge domain/knowledge base. The knowledge update flow operation 510 may use one or more matching operations (e.g., fuzzy matching operations). Also, when extending knowledge domain/knowledge base, knowledge update flow operation 510 determine/check if the nodes already exist, based on synonyms and fuzzy matching operations.

In block 518, a wait operation may be performed so as to wait for the next consumed data content (e.g., wait for the next page of a book that the user is reading). That is, the knowledge update flow operation 510 may recognize one or more new pages of text that can be based on or more of the following: 1) detecting that the text is entirely different, 2) detecting movements classified as page turning (e.g., action recognition via deep learning, or open source computer vision "OpenCV"), and/or 3) recognizing a page number.

For example, the knowledge update flow operation 510 may recognize text of book page (e.g., "John Doe named his owl Buddy" using a wearable camera and/or computer vision module/component, which may detect text in a field of view ("FOV"), detect text using an optical character recognition ("OCR") operation, and/or may provide input for text analytics. The knowledge update flow operation 510 may analyze, via an analytical component the text such as, for example, by triple extraction from one or more sentences, as illustrated in the following pseudocode:

@article{article, author = {Jack Doe};
year = {2019}, month = {02}, pages = { }, title = {Triplet extraction from sentences}}.

In one aspect, the analytical operations may include performing a natural language understanding operation (e.g., name recognition, concept extraction, sentiment understanding/learning, analyzing one or more diagrams and/or one or more relations/relationships between objects (e.g., a triplet of information that includes basic elements to descript a relationship such as, for example, "John Doe, owns, Owl").

The knowledge update flow operation 510 may extend the knowledge (e.g., knowledge graph, tabulated data) represented in an RDF graph such as, for example, (John Doe, owns, Owl) and (Owl, has_name, Buddy). The knowledge update flow operation 510 may use one or more data capturing devices (e.g., camera, smart glasses, computer device, IoT device) to recognize new page of text.

Figure 5C:
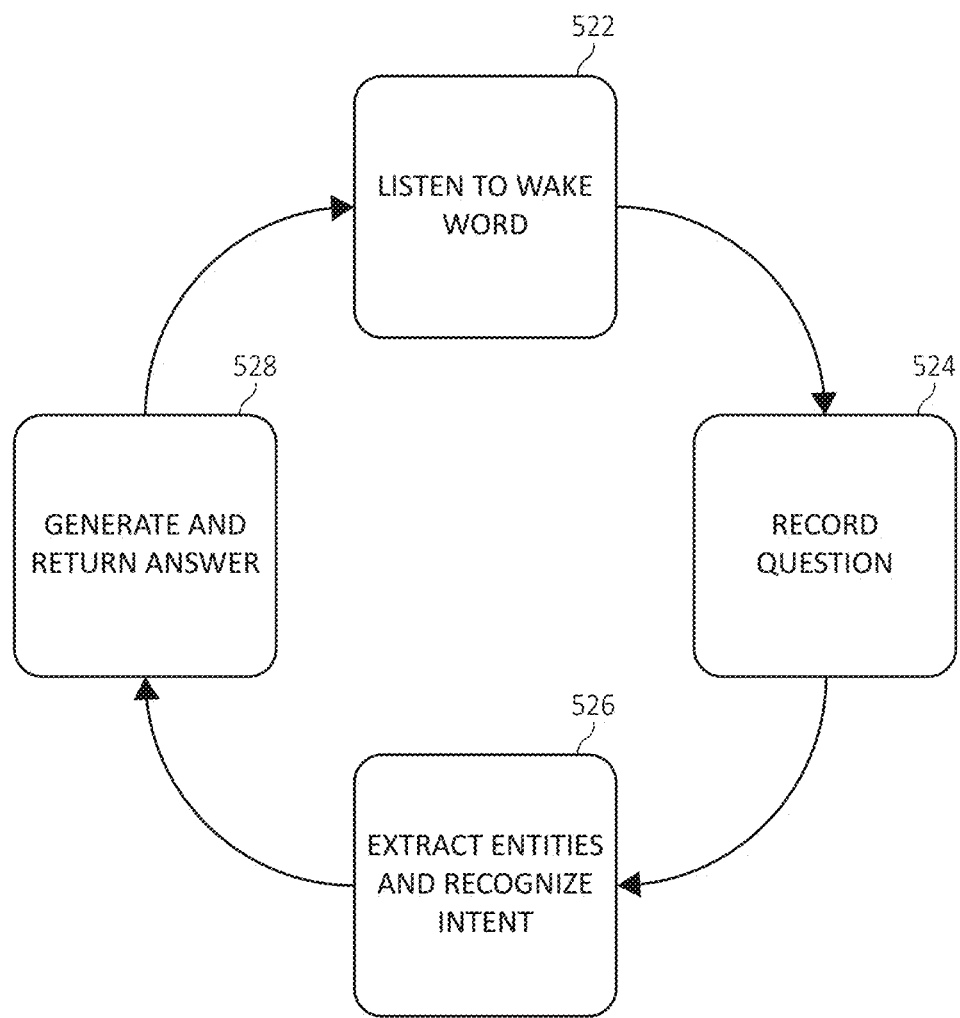

As depicted in FIG. 5C, the query flow operation 520 may include listening to a wake word, as in block 522. In block 524, a query (e.g., question) may be recorded. One or more entities may be extracted and the intent (e.g., the intent of the query/question or the extracted entities) may be recognized, as in block 526. The query flow operation 520 may include generating and providing/returning an answer based on the received query/questions, as in block 528.

For example, the query flow operation 520 may detect a user asking a query such as, for example, "What is the name of John Doe's owl?" The query flow operation 520 may recognize one or more entities, concepts, keywords such as, for example, "John Doe," "owns," "owl," and "name." The query flow operation 520 may identify a node in the knowledge graph "John Doe" and executes a search from the "John Doe" node, but may be constrained to relevant edges such as, for example, edges labeled as "owns" and "has-name," and also to nodes such as "owl" (with synonyms such as "pet," "bird," etc.) and nodes storing an actual name.

Additionally, it should be noted that, the query flow operation 520 may use one or more defined or "selected" wake words to detect wake word such as, for example, "Hey" and "What is the name of Harry Potter's Owl?" The query flow operation 520 may also convert audio or media data to text and run an entity and intent recognition such as, for example, entities={John Doe, Owl}, Intent=#find_name.

The query flow operation 520 may also access the knowledge domain/knowledge base to retrieve information such as, for example, by searching a knowledge graph for an Owl's name. The query flow operation 520 may also generate a NLP sentence/response that answers the query/question such as, for example, the information found is "The name of the Owl is Buddy" or, in the alternative, the information not found is "the name of the Owl has not been learned so far." Also, the answer may be provided in a template populated with data from the knowledge domain/knowledge base. In the event that multiple users provide one or more queries such as, for example, "what was the definition of entanglement" that is found on page 50, the query flow operation 520 may automatically recognize the query and definition and make suggestions to the creator of the text.

Figure 6:
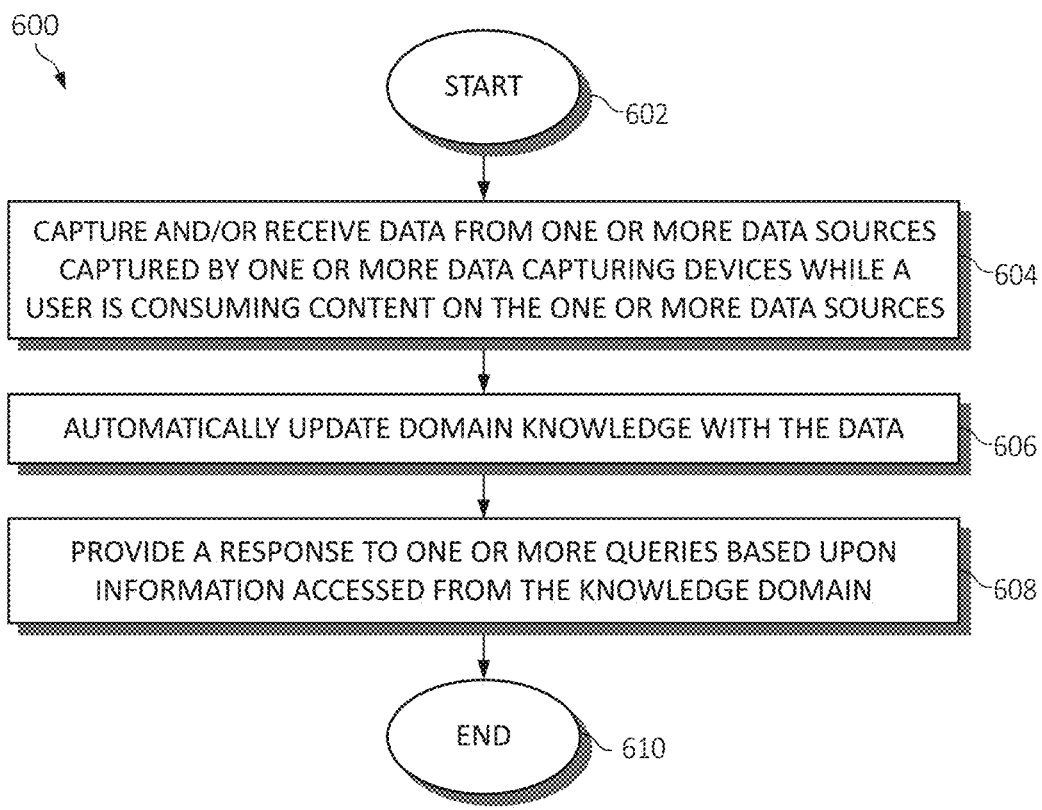
FIG. 6 is a flowchart diagram depicting an additional exemplary method for providing data content consumption support by a processor; again in which aspects of the present invention may be realized.

Turning now to FIG. 6, a method 600 for providing data content consumption support by a processor is depicted, in which various aspects of the illustrated embodiments may be implemented. That is, FIG. 6 is a flowchart of an example method 600 for providing reading support for a user consuming data while engaged in reading activities in a computing environment according to an example of the present invention. The functionality 600 may be implemented as a method executed as instructions on a machine, where the instructions are included on at least one computer readable medium or one non-transitory machine-readable storage medium. The functionality 600 may start in block 602.

Data from one or more data sources may be captured and/or received by one or more data capturing devices while a user is consuming the data on the one or more data sources, as in block 604. A domain knowledge may be automatically updated with the data, as in block 606. A response may be provided to one or more queries based upon information accessed from the knowledge domain, as in block 608. The functionality 600 may end, as in block 610.

In one aspect, in conjunction with and/or as part of at least one block of FIG. 6, the operation of 600 may include one or more of each of the following. The operation of 600 may capture the one or more queries from the user via an audio capturing or display device, an image capturing or display device, an Internet of Things ("IoT") device or sensor, a graphical user interface ("GUI"), an electronic stylus, or a combination thereof, and/or provide the response via the audio capturing or display device, the image capturing or display device, the IoT device or sensor, the GUI, the electronic stylus, or a combination thereof.

The operation of 600 may extract the data from one or more data sources while the user is consuming the data, wherein the extracted data includes image data, audio data, media data, contextual data, relational data pertaining to current amount of consumed content or historically consumed content, or a combination thereof. The operation of 600 may analyze the data to identify a current amount of consumed data, the one or more queries relating to selected portions of the consumed data or historically consumed content, or a combination thereof.

The operation of 600 may enhance existing data in the domain knowledge with the data, suggest one or more revisions or editions to the data captured from the one or more data sources, and/or reset the domain knowledge upon commencement of consuming alternative data from one or more alternative data sources.

The operation of 600 may search and identify, in a knowledge graph, one or more concepts, semantic references or definitions, keywords, or one or more relationships between one or more entities from the data according to the one or more queries. In one aspect, the one or more concepts, the semantic references or definitions, the keywords, and the one or more entities are nodes within the knowledge graph representing the domain knowledge.

The operation of 600 may implement a machine learning operation to 1) perform a natural language processing ("NLP") operation upon the data, 2) convert image data, audio data, or a combination thereof to textual data, 3) determine one or more concepts, semantic references or definitions, keywords, or one or more relationships between one or more entities; 4) determine a selected amount of consumed data or non-consumed data to be included in the response to the one or more queries; 5) restrict an alternative selected amount of the consumed data or the non-consumed data from being included in the response to the one or more queries; and/or 6) learns one or more concepts, semantic references or definitions, keywords, or one or more relationships between one or more entities from the data.

In one aspect, the operation of 600 may display the knowledge graph representing the domain knowledge as a multi-graph representation in an interactive graphical user interface (GUI), provide support to the user for providing the response to one or more queries including reasoning (e.g., automatic analysis and/or interaction by a user).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for providing data content consumption support in a computing environment, comprising:
   receiving data from one or more data sources captured by one or more data capturing devices while a user is consuming the data on the one or more data sources;
   executing machine learning logic to generate a content model using the data;
   automatically updating a knowledge domain with the data; and
   providing a response to one or more queries, directed to one or more specific questions regarding content of the data, based upon information accessed from the knowledge domain and an output of the content model.

2. The method of claim 1, further including:
   capturing the one or more queries from the user via an audio capturing or display device, an image capturing or display device, an Internet of Things ("IoT") device or sensor, a graphical user interface ("GUI"), an electronic stylus, or a combination thereof; or
   providing the response via the audio capturing or display device, the image capturing or display device, the IoT device or sensor, the GUI, the electronic stylus, or a combination thereof.

3. The method of claim 1, further including extracting the data from one or more data sources while the user is consuming the data, wherein the extracted data includes image data, audio data, media data, contextual data, relational data pertaining to current amount of consumed content or historically consumed content, or a combination thereof.

4. The method of claim 1, further including analyzing the data to identify a current amount of consumed data, the one or more queries relating to selected portions of the consumed data or historically consumed content, or a combination thereof.

5. The method of claim 1, further including:
   enhancing existing data in the domain knowledge with the data; or
   suggesting one or more revisions or editions to the data captured from the one or more data sources; or
   resetting the domain knowledge upon commencement of consuming alternative data from one or more alternative data sources.

6. The method of claim 1, further including searching and identifying, in a knowledge graph, one or more concepts, semantic references or definitions, keywords, or one or more relationships between one or more entities from the data according to the one or more queries, wherein the one or more concepts, the semantic references or definitions, the keywords, and the one or more entities are nodes within the knowledge graph representing the domain knowledge.

7. The method of claim 1, further including implementing executing the machine learning logic to:
   perform a natural language processing ("NLP") operation upon the data;
   convert image data, audio data, or a combination thereof to textual data;
   determine one or more concepts, semantic references or definitions, keywords, or one or more relationships between one or more entities;
   determine a selected amount of consumed data or non-consumed data to be included in the response to the one or more queries;
   restrict an alternative selected amount of the consumed data or the non-consumed data from being included in the response to the one or more queries; or
   learn one or more concepts, semantic references or definitions, keywords, or one or more relationships between one or more entities from the data.

8. A system for providing data content consumption support in a computing environment, comprising:
   one or more computers with executable instructions that when executed cause the system to:
      receive data from one or more data sources captured by one or more data capturing devices while a user is consuming the data on the one or more data sources;
      execute machine learning logic to generate a content model using the data;
      automatically update a knowledge domain with the data; and
      provide a response to one or more queries, directed to one or more specific questions regarding content of the data, based upon information accessed from the knowledge domain and an output of the content model.

9. The system of claim 8, wherein the executable instructions:
   capture the one or more queries from the user via an audio capturing or display device, an image capturing or display device, an Internet of Things ("IoT") device or sensor, a graphical user interface ("GUI"), an electronic stylus, or a combination thereof; or provide the response via the audio capturing or display device, the image capturing or display device, the IoT device or sensor, the GUI, the electronic stylus, or a combination thereof.

10. The system of claim 8, wherein the executable instructions extract the data from one or more data sources while the user is consuming the data, wherein the extracted data includes image data, audio data, media data, contextual data, relational data pertaining to current amount of consumed content or historically consumed content, or a combination thereof.

11. The system of claim 8, wherein the executable instructions analyze the data to identify a current amount of consumed data, the one or more queries relating to selected portions of the consumed data or historically consumed content, or a combination thereof.

12. The system of claim 8, wherein the executable instructions:
enhance existing data in the domain knowledge with the data; or
suggest one or more revisions or editions to the data captured from the one or more data sources; or
reset the domain knowledge upon commencement of consuming alternative data from one or more alternative data sources.

13. The system of claim 8, wherein the executable instructions search and identify, in a knowledge graph, one or more concepts, semantic references or definitions, keywords, or one or more relationships between one or more entities from the data according to the one or more queries, wherein the one or more concepts, the semantic references or definitions, the keywords, and the one or more entities are nodes within the knowledge graph representing the domain knowledge.

14. The system of claim 8, wherein the executable instructions execute the machine learning logic to:
perform a natural language processing ("NLP") operation upon the data;
convert image data, audio data, or a combination thereof to textual data;
determine one or more concepts, semantic references or definitions, keywords, or one or more relationships between one or more entities;
determine a selected amount of consumed data or non-consumed data to be included in the response to the one or more queries;
restrict an alternative selected amount of the consumed data or the non-consumed data from being included in the response to the one or more queries; or
learns one or more concepts, semantic references or definitions, keywords, or one or more relationships between one or more entities from the data.

15. A computer program product for, by a processor, providing data content consumption support in a computing environment, the computer program product comprising a non-transitory computer-readable storage medium having computer-readable program code portions stored therein, the computer-readable program code portions comprising:
an executable portion that receives data from one or more data sources captured by one or more data capturing devices while a user is consuming the data on the one or more data sources;
an executable portion that executes machine learning logic to generate a content model using the data;
an executable portion that automatically updates a knowledge domain with the data; and
an executable portion that provides a response to one or more queries, directed to one or more specific questions regarding content of the data, based upon information accessed from the knowledge domain and an output of the content model.

16. The computer program product of claim 15, further including an executable portion that:
captures the one or more queries from the user via an audio capturing or display device, an image capturing or display device, an Internet of Things ("IoT") device or sensor, a graphical user interface ("GUI"), an electronic stylus, or a combination thereof; or
provides the response via the audio capturing or display device, the image capturing or display device, the IoT device or sensor, the GUI, the electronic stylus, or a combination thereof.

17. The computer program product of claim 15, further including an executable portion that extracts the data from one or more data sources while the user is consuming the data, wherein the extracted data includes image data, audio data, media data, contextual data, relational data pertaining to current amount of consumed content or historically consumed content, or a combination thereof.

18. The computer program product of claim 15, further including an executable portion that:
analyzes the data to identify a current amount of consumed data, the one or more queries relating to selected portions of the consumed data or historically consumed content, or a combination thereof;
enhances existing data in the domain knowledge with the data;
suggests one or more revisions or editions to the data captured from the one or more data sources; or
reset the domain knowledge upon commencement of consuming alternative data from one or more alternative data sources.

19. The computer program product of claim 15, further including an executable portion that searches and identifies, in a knowledge graph, one or more concepts, semantic references or definitions, keywords, or one or more relationships between one or more entities from the data according to the one or more queries, wherein the one or more concepts, the semantic references or definitions, the keywords, and the one or more entities are nodes within the knowledge graph representing the domain knowledge.

20. The computer program product of claim 15, further including an executable portion that executes the machine learning logic to:
performs a natural language processing ("NLP") operation upon the data;
converts image data, audio data, or a combination thereof to textual data;
determine one or more concepts, semantic references or definitions, keywords, or one or more relationships between one or more entities;
determines a selected amount of consumed data or non-consumed data to be included in the response to the one or more queries;
restricts an alternative selected amount of the consumed data or the non-consumed data from being included in the response to the one or more queries; or
learns one or more concepts, semantic references or definitions, keywords, or one or more relationships between one or more entities from the data.

\* \* \* \* \*